Patented Apr. 19, 1949

2,467,895

UNITED STATES PATENT OFFICE 2,467,895

PIPERAZINE DERIVATIVES AND METHOD OF PREPARING THE SAME

Samuel Kushner, Montvale, N. J., and Louis Brancone, Pearl River, N. Y., assignors to American Cyanamid Company, New York, N. Y., a corporation of Maine No Drawing. Application April 12, 1946, Serial No. 661,884

12 Claims. (Cl. 260—268)

1

The present invention relates to substituted piperazines. More particularly, it relates to piperazine carboxamides and to methods of preparing the same.

The new compounds of the present invention have the following general formula:

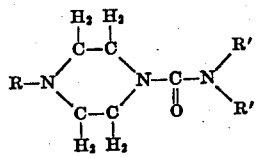

in which R is a hydrogen or alkyl radical and R' is an alkyl radical.

In the general formula R can be hydrogen or an alkyl radical such as methyl, ethyl, propyl, isopropyl, butyl, isobutyl, tertiary butyl, amyl, isoamyl, hexyl, etcetera. R' can be an alkyl radical such as those above.

In general, the compounds prepared by the present invention are colorless to pale yellow oils soluble in most organic solvents. In the form of their acid salts they are white, hygroscopic solids soluble in water.

These compounds are prepared by reacting piperazine or an N-alkyl piperazine with a substituted carbamyl chloride. The reaction is carried out within the range of 0° C. to about 40° C., preferably at room temperature in a solvent such as chloroform, carbon tetrachloride, ethyl acetate, water, etc.

When chloroform or similar organic solvent is used in carrying out the present invention we prefer to recover the product by first saturating the reaction mixture with hydrogen chloride at a low temperature. Any unreacted piperazine is precipitated as the hydrochloride salt and can be removed by filtration. The reaction mixture is concentrated by removal of solvent and the product obtained as a solid is recrystallized if desired.

When the reaction is carried in water as the solvent, in the presence of alkali, the preferred method of recovering the product is to saturate the reaction mixture with potassium carbonate, ammonium sulfate or similar salt. The product is then extracted with a solvent such as ether or chloroform, preferably dried and then distilled.

2

Among the new compounds which can be prepared by the process of the present invention are the following:

1-piperazine-N,N-dimethyl carboxamide
1-piperazine-N,N-diethyl carboxamide
1-piperazine-N,N-dipropyl carboxamide
1-methyl-4-piperazine-N,N-dimethyl carboxamide
1-methyl-4-piperazine-N,N-diethyl carboxamide
1-ethyl-4-piperazine-N,N-diethyl carboxamide
1-methyl-4-piperazine-N,N-dipropyl carboxamide
1-methyl-4-piperazine-N,N-diisopropyl carboxamide
1-isopropyl-4-piperazine-N,N-diethyl carboxamide
1-isopropyl-4-piperazine-N,N-diisopropyl carboxamide
1-methyl-4-piperazine-N,N-dibutyl carboxamide
1-methyl-4-piperazine-N,N-ditertiarybutyl carboxamide
1-ethyl-4-piperazine-N,N-diamyl carboxamide Some of these compounds are useful in the treatment of filariasis and in veterinary practice in the treatment of ascrids in dogs.

Our invention will now be illustrated in greater particularity by means of the following specific examples, in which representative piperazine-carboxamides are prepared.

Example 1

To 43.5 g. of 1-methyl piperazine dihydrochloride was added 81.4 g. of calcium hydroxide. The two were intimately mixed and the mixture distilled. The distillate was dried over solid potassium hydroxide. The solution was filtered and dried over magnesium sulfate after ether had been added. The ether was removed and the residue distilled. A yield of 9.0 g. of 1-methyl piperazine was obtained which was the fraction boiling between 127°–137° C.

To 9.0 g. of 1-methyl piperazine dissolved in 25 cc. of chloroform was added dropwise with stirring over a period of an hour and a half, 6.12 g. of diethyl carbamyl chloride in about 25 cc. of chloroform. The reaction beaker was cooled in an ice bath. When all the reagent had been added, the solution was stirred for an additional half hour. It was then saturated with hydrogen chloride. The solid that came down was removed by filtration. The filtrate was concentrated by removing the solvent. On scratching the flask a white solid appeared which was removed and suspended in ether. The solid material was removed from the ether by filtering and quickly transferred to a drying pistol. A yield of 8.5 g. of 1-methyl-4-piperazine-N,N-diethyl carboxamide dihydrochloride was obtained.

*Example 2*

A second run made under the same conditions as in Example 1 except that 9.0 g. of 1-methyl piperazine was reacted with 12.2 g. of diethyl carbamyl chloride gave a yield slightly lower than that of Example 1.

*Example 3*

To 10 g. of 1-methyl piperazine dissolved in 25 cc. of chloroform was added dropwise with stirring over a period of 1½ hours, 5.4 g. of dimethyl carbamyl chloride dissolved in chloroform. When all the reagent had been added to the reaction vessel, cooled in an ice bath, the mixture was stirred for an additional half hour. It was saturated with hydrogen chloride and the solid formed removed by filtration. After removing the solvent and scratching the flask a white solid appeared. The solid after being suspended in ether was removed by filtration and transferred to a drying pistol. A yield of 3.5 g. of 1-methyl-4-piperazine-N,N-dimethyl carboxamide hydrochloride was obtained which on recrystallization melted at 180°–181° C.

*Example 4*

In a three neck flask was placed 250 cc. of dry toluene and with ice cooling, phosgene was passed in until 24 g. had been absorbed. Then, with stirring, a solution of 50 g. of di-iso-propyl amine in 250 cc. of dry toluene was dropped in, keeping the temperature below 0° C. by cooling with Dry Ice. The mixture was allowed to stand about 72 hours, then the di-isopropyl amine hydrochloride was filtered and washed with toluene, the combined toluene solutions were evaporated in vacuum, and the residue was vacuum-distilled. There was obtained 26 g. of di-isopropyl carbamyl chloride which had a boiling point of 90°–93° C./15 mm.

To a stirred solution at room temperature of 5 cc. of 1-methyl piperazine in 100 cc. of chloroform was added, dropwise during the course of ¾ hour, 4.1 g. of diisopropyl carbamyl chloride in 50 cc. of chloroform. After standing at room temperature for 15 minutes, the clear solution was cooled in ice and then treated with hydrogen chloride. The 1-methyl piperazine dihydrochloride was filtered and the filtrate was evacuated to a solid on a water bath (30° C.) and the water pump. Fifty cc. of chloroform was added and the murky solution was filtered through activated carbon. This was again evacuated to a solid. A yield of 4.0 g. of 1-methyl-4-piperazine-N,N-diisopropyl carboxamide hydrochloride was obtained which on recrystallization from chloroform and ethyl acetate melted at 200–203° C.

*Example 5*

To 50 cc. of water was added 18 g. of 1-methyl piperazine dihydrochloride and 8.34 g. of sodium hydroxide. When solution had been effected the beaker was cooled to 10° C. and with stirring, 4.17 g. of sodium hydroxide dissolved in 15 cc. of water and 14 g. of diethyl carbamyl chloride were added simultaneously. When all had been added, the solution was extracted 3 times with ether which was then dried and filtered. The ether solution was saturated with dry hydrogen chloride. A yellow gum appeared which on trituration gave a white, hygroscopic solid which was filtered and dried in the pistol. The 1-methyl-4-piperazine-N,N-diethyl carboxamide hydrochloride had a melting point of 150°–155° C.

*Example 6*

In a 5 liter 3 neck flask was placed 442 g. of isopropyl p-toluene sulfonate, 246 g. of 1-carbethoxy piperazine, 107 g. of sodium carbonate, and 700 cc. of dry isopropanol. The mixture was stirred and refluxed on the steam bath for 28 hours. The solid material was then filtered off, washed with ether, and ether added to the filtrate, which was concentrated under vacuum. To the cooled residue was added 4 liters of cold 1 N. potassium hydroxide solution and the resulting solution was extracted four times with ether. The ether solution was dried over anhydrous magnesium sulfate, the ether removed, and the residue distilled. A yield of 234 g. (75%) of 1-isopropyl 4-carbethoxy-piperazine was obtained.

To 100 g. of 1-isopropyl 4-carbethoxy piperazine was added 500 cc. of concentrated hydrochloric acid. The mixture was refluxed for three days at the end of which time, the solution was concentrated to a small volume under vacuum. The product which separated was filtered off and the filtrate when taken to dryness yielded a further amount of product. The product was 1-isopropyl piperazine dihydrochloride.

To 58 g. of 1-isopropyl piperazine dihydrochloride was added just enough methanol to cover the solid. To this was added a suspension of 32.4 g. of sodium methoxide in 200 cc. of ether. This mixture was allowed to stand for an hour and then filtered. The filtrate was taken to dryness with a vacuum pump. The residue was fractionated with chloroform. The product obtained was 1-isopropyl piperazine boiling at about 175° C.

To 9 g. of 1-isopropyl piperazine dissolved in 25 cc. of chloroform was added dropwise with stirring over a period of an hour and a half 4.76 g. of diethyl carbamyl chloride in about 25 cc. of chloroform. The reaction beaker was cooled in an ice bath. When all the reagent had been added, the solution was stirred for half an hour. On saturating the solution with hydrogen chloride a solid separated which was removed by filtration. The filtrate was evaporated to almost dryness and on scratching the flask a white solid appeared. The solid was suspended in ether, filtered and dried. A yield of 3.7 g. of 1-isopropyl-4 - piperazine-N,N-diethyl carboxamide hydrochloride melting at 198°–208° C. was obtained.

*Example 7*

A solution of 32 g. of anhydrous piperazine in 225 cc. of ethyl alcohol was prepared and 50 g. of diethyl carbamyl chloride was added in small portions. After the addition was complete a solid began to separate and about 100 cc. of water was added to bring it into solution. After standing 24 hours the mixture was evaporated in vacuo to about 75 cc. The mixture was extracted with ether, dried over magnesium sulfate and distilled. A yield of 21.7 g. of 1-piperazine-N,N-diethyl carboxamide was obtained, boiling at 175°–180°/2 mm.

Example 8

To a solution of 16 g. of piperazine in 100 cc. of ethyl alcohol was added with moderate cooling 24 g. of dimethyl carbamyl chloride. A precipitate came out of solution which was redissolved by the addition of 40 cc. of water. After three days at room temperature the product was worked up as described in previous examples. A yield of 5.5 g. of 1-piperazine-N,N-dimethyl carboxamide was obtained having a boiling point of 144°–146° C./15 mm.

In some of the examples shown above the hydrochloride salts of the piperazine derivatives are obtained. If the compound itself is desired, the salt is dissolved in water and the solution saturated with a mild alkali such as potassium carbonate. The product is then extracted with chloroform, dried, and after removal of the chloroform, distilled.

We claim:

1. 1-methyl-4-piperazine-N,N-diethyl carboxamide.
2. 1-piperazine-N,N-diethyl carboxamide.
3. 1-methyl-4-piperazine-N,N-dimethyl carboxamide.
4. A method of preparing 1-methyl-4-piperazine-N,N-diethyl carboxamide which comprises mixing together 1-methyl piperazine with diethyl carbamyl chloride in a solvent.
5. A method of preparing 1-piperazine-N,N-diethyl carboxamide which comprises mixing piperazine with diethyl carbamyl chloride in a solvent.
6. A method of preparing 1-methyl-4-piperazine-N,N-dimethyl carboxamide which comprises mixing 1-methyl piperazine with dimethyl carbamyl chloride in a solvent.
7. Compounds having the general formula:

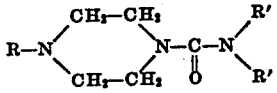

in which R is a member of the group consisting of hydrogen and alkyl radicals and R' is an alkyl radical, and salts thereof.

8. Compounds having the general formula:

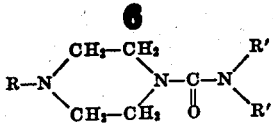

in which R and R' are alkyl radicals.

9. Compounds having the general formula:

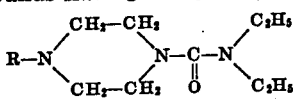

in which R is an alkyl radical.

10. Compounds having the general formula:

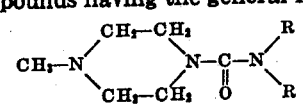

in which R is an alkyl radical.

11. A method of preparing compounds having the formula:

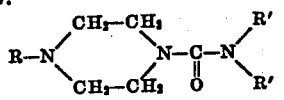

in which R is a member of the group consisting or hydrogen and alkyl radicals and R' is an alkyl radical which comprises mixing together and allowing to react a member of the group consisting of piperazine and 1-alkyl piperazines and a dialkyl carbamyl chloride in a solvent.

12. A method of preparing compounds having the formula:

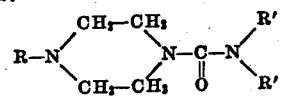

in which R and R' are alkyl radicals which comprises mixing together and allowing to react a 1-alkyl piperazine and a dialkyl carbamyl chloride in a solvent.

SAMUEL KUSHNER.
LOUIS BRANCONE.

REFERENCES CITED

The following references are of record in the file of this patent:

Beilstein Vierte auflage Band XXIII, page 12.
Jour. Am. Chem. Soc. 66, pp. 265–6 (1944).